J. H. DOAK.
ROASTING AND BOILING DEVICE.
APPLICATION FILED JULY 7, 1919.
1,337,122.
Patented Apr. 13, 1920.
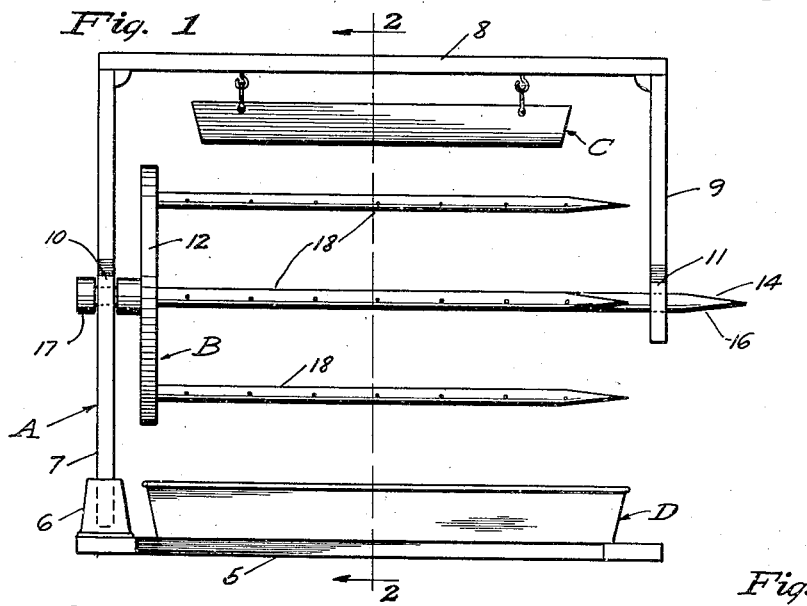
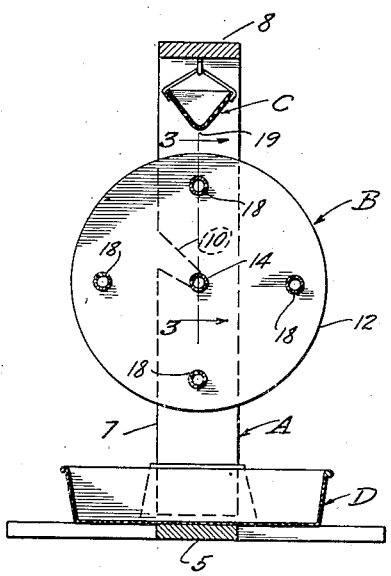
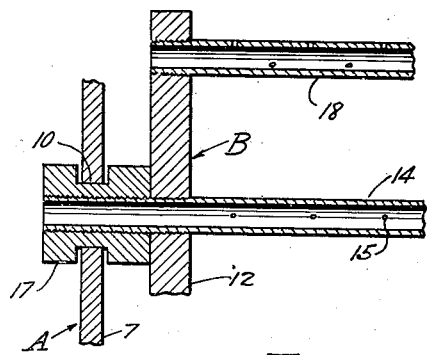
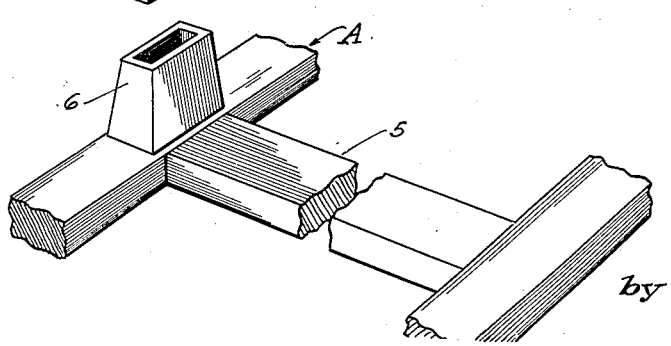
Inventor
John H. Doak
by Westall and Wallace
his Attorneys

UNITED STATES PATENT OFFICE.

JOHN H. DOAK, OF LOS ANGELES, CALIFORNIA.

ROASTING AND BOILING DEVICE.

1,337,122.  Specification of Letters Patent.  Patented Apr. 13, 1920.

Application filed July 7, 1919. Serial No. 309,134.

*To all whom it may concern:*

Be it known that I, JOHN H. DOAK, a citizen of the United States, residing at Los Angeles, in the county of Los Angeles and State of California, have invented new and useful Improvements in Roasting and Boiling Devices, of which the following is a specification.

This invention relates to a spit and the primary object thereof is to provide a device whereby the time required for cooking meat will be shortened, and a more uniform cooking throughout the body of the meat will be secured.

It is an object of this invention to provide a device of the character described, which in addition to supporting the meat will provide for the circulation of the hot fluids, such as air in roasting and the liquors in boiling, through the body of the meat.

Another object of this invention is to provide a simple, durable, compact device of the character described, easy to manipulate.

These objects will be more fully understood as will also other objects and corresponding accomplishments of my invention from the following detailed description of a preferred embodiment thereof. For the purpose of this description reference is had to the accompanying drawing, in which:

Figure 1 is a front elevation of the complete device; Fig. 2 is a section taken on the line 2—2 of Fig. 1; Fig. 3 is an enlarged fragmentary section as seen on the line 3—3 of Fig. 2; and Fig. 4 is a perspective view of a fragment of the supporting foot with the leg of the standard detached therefrom.

Referring particularly to Fig. 1, the device consists of a support A for a spit B. Depending from the support over the spit is a basting receptacle C to contain the juices and water for basting. Disposed beneath the spit is a drip pan D for catching the juices.

The support comprises a foot 5 at the heel of which is a socket 6 adapted to receive a leg 7. Extending from the leg 7 is the bracket 8 which is horizontal, and depending therefrom at the end is a hanger member 9. Formed in the leg 7 is a notch 10, the lower end thereof serving as a bearing for the shaft of the spit. In alinement with notch 10 and formed in the hanger 9 is a similar notch 11 for the other end of the shaft of the spit.

The spit comprises a disk 12 having a threaded opening formed at the center thereof, and a number of similar openings adjacent the periphery. Extending through the center opening and preferably engaged therewith by threads is the hollow shaft 14. This shaft is provided with perforations 15 and the free end is formed with a sharp point 16 for penetrating the meat. Mounted upon the other end of the shaft is a thrust collar 17, the groove in which is disposed in the notch 10. The shaft 14 is long enough so that it extends through the notch 11 in the hanger 9. Secured in the other opening in the disk 12 are hollow skewers 18. These are preferably threaded into the disk so that the bore is open. The skewers are shorter than the shaft 14 so that they will clear the inside of the hanger; the ends thereof are formed with sharp points, and perforations are distributed thereover.

Supported by hooks or any other suitable means from the bracket 8 is the basting receptacle C. This receptacle is preferably formed with converging side walls as shown in Fig. 2 and has perforations 19 formed at the lower edge thereof. Thus the water and juices for basting may be placed therein and allowed to slowly drip over the meat supported upon the spit. The drip pan D is of the usual type. It is placed beneath the spit resting upon the foot 5.

To roast meat, the spit is forced therethrough so that the points of the skewers extend through the other side of the meat. The spit is then placed in position on the support, the latter being disposed in an oven. The hot air may circulate through the bores of the skewers and the bores of the shaft, thereby roasting the meat on the inside as well as on the outside. The juices may also pass through the perforations in the skewers and shaft. From time to time the spit may be turned. The basting liquors are placed in the basting receptacle C and allowed to drip over the meat, being caught in the drip pan D.

The basting receptacle C and drip pan D form no part of my invention, but are merely for use when the device is employed for roasting. When the device is to be used for boiling meat, the spit is passed through the piece, and the entire device placed within the boiling liquor. The operation will be obvious.

What I claim is:

1. In a device of the class described, the combination of a support, a rotary spit removably journaled thereon comprising a hollow shaft forming a skewer, and skewers parallel thereto and revoluble with said shaft, said skewers being open for the circulation of the hot cooking fluids and pointed at the ends to penetrate articles to be cooked.

2. In a device of the class described, the combination of a support, a spit comprising a perforated hollow shaft horizontally and detachably journaled thereon, a disk secured thereto, and hollow perforated skewers secured to and opening through said disk for the circulation of hot cooking fluids.

In witness that I claim the foregoing I have hereunto subscribed my name this 30th day of June, 1919.

JOHN H. DOAK.